United States Patent
Dooley et al.

(10) Patent No.: US 9,096,326 B2
(45) Date of Patent: Aug. 4, 2015

(54) NITROGEN BUBBLER SYSTEM IN FUEL TANK AND METHOD

(71) Applicant: PRATT & WHITNEY CANADA CORP., Longueuil (CA)

(72) Inventors: Kevin Allan Dooley, Mississauga (CA); David Waddleton, Candiac (CA); Thomas A. Bush, Vernon Rockville, CT (US)

(73) Assignee: PRATT & WHITNEY CANADA CORP., Longueuil (CA)

( * ) Notice: Subject to any disclaimer, the term of this patent is extended or adjusted under 35 U.S.C. 154(b) by 127 days.

(21) Appl. No.: 13/790,653

(22) Filed: Mar. 8, 2013

(65) Prior Publication Data

US 2014/0252171 A1    Sep. 11, 2014

(51) Int. Cl.
*B64D 37/32* (2006.01)
*B01D 19/00* (2006.01)

(52) U.S. Cl.
CPC ............... *B64D 37/32* (2013.01); *B01D 19/00* (2013.01)

(58) Field of Classification Search
CPC .................................. B01D 19/00; B64D 37/32
USPC ............................ 220/562, 565, 88.3; 96/174
See application file for complete search history.

(56) References Cited

U.S. PATENT DOCUMENTS

| | | | |
|---|---|---|---|
| 2,964,916 A * | 12/1960 | Keeping | 62/46.1 |
| 3,229,446 A | 1/1966 | Sebastian et al. | |
| 3,732,668 A * | 5/1973 | Nichols | 96/174 |
| 3,788,039 A | 1/1974 | Bragg | |
| 3,948,626 A | 4/1976 | Bragg | |
| 4,008,038 A * | 2/1977 | Berthiaume | 431/11 |
| 6,820,659 B2 | 11/2004 | Sauer | |
| 7,459,081 B2 | 12/2008 | Koenig et al. | |
| 7,871,461 B2 * | 1/2011 | Saito | 96/174 |
| 2010/0254752 A1 | 10/2010 | Shook | |

FOREIGN PATENT DOCUMENTS

| | | |
|---|---|---|
| GB | 992967 | 1/1961 |
| GB | 1264842 A | 2/1972 |
| WO | 0228714 A1 | 4/2002 |

* cited by examiner

*Primary Examiner* — Stephen Castellano
(74) *Attorney, Agent, or Firm* — Norton Rose Fulbright Canada LLP

(57) ABSTRACT

An assembly of fuel tank and bubbler system comprises a fuel tank defining a storage volume adapted to receive fuel therein. The fuel tank comprises at least one fuel inlet, at least one fuel outlet, and at least one gas inlet adapted to be connected to an inert gas source to feed inert gas to fill an ullage in the storage volume. A bubbler system has at least one pipe extending into the fuel tank and adapted to be immersed into the fuel of the fuel tank. The pipe has a porous structure. The pipe is adapted to be connected to an inert gas source to inject inert gas via the porous structure into the fuel of the fuel tank. A method for treating fuel in a fuel tank is also provided.

10 Claims, 1 Drawing Sheet

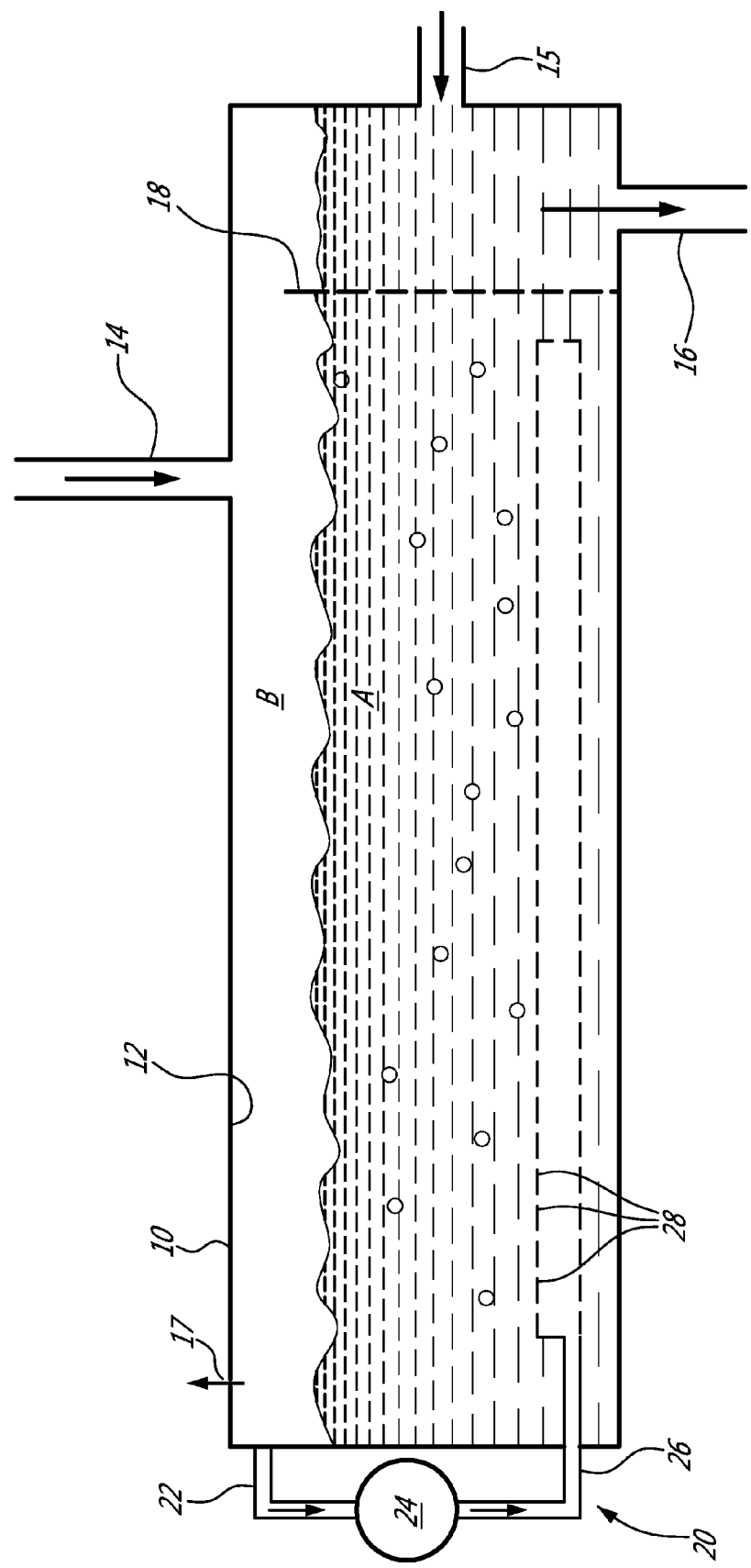

NITROGEN BUBBLER SYSTEM IN FUEL TANK AND METHOD

TECHNICAL FIELD

The present application relates to fuel systems for aircraft and, more particularly, to fuel tanks thereof.

BACKGROUND OF THE ART

Inerting of the ullage in aircraft fuel tanks is performed to reduce the explosion hazard of partially filled aircraft fuel tanks, and is generally achieved by filling the ullage with an inert gas such as Nitrogen. There is a separate need to reduce the autoxidation tendency of fuel exposed to high temperatures as it flows through passages inside the engine. The dissolved oxygen content of fuel is the result of exposure of the fuel to air (containing Nitrogen and Oxygen). The propensity for gasses to be dissolved into a liquid is a result of the partial pressures of the gases that the liquid is exposed to, and the natural saturation limit of the liquid in question. Hence, to reduce the autoxidation tendency of fuel, some existing systems use vacuum and a special membrane to reduce the partial pressure of the oxygen in the fuel, and thus reduce the tendency of the fuel to oxidize at elevated temperatures.

SUMMARY

In one aspect, there is provided an assembly of fuel tank and bubbler system comprising: a fuel tank defining a storage volume adapted to receive fuel therein, the fuel tank comprising at least one fuel inlet, at least one fuel outlet, and at least one gas inlet adapted to be connected to an inert gas source to feed inert gas to fill an ullage in the storage volume; and a bubbler system having at least one pipe extending into the fuel tank and adapted to be immersed into the fuel of the fuel tank, the pipe having a porous structure, the at least one pipe adapted to be connected to an inert gas source to inject inert gas via the porous structure into the fuel of the fuel tank.

In a second aspect, there is provided an aircraft comprising: a fuel tank defining a storage volume adapted to receive fuel therein, the fuel tank comprising at least one fuel inlet, at least one fuel outlet, and at least one gas inlet adapted to be connected to an inert gas source to feed inert gas to fill an ullage in the storage volume; and a bubbler system having at least one pipe extending into the fuel tank and adapted to be immersed into the fuel of the fuel tank, the pipe having a porous structure, the at least one pipe adapted to be connected to an inert gas source to inject inert gas via the porous structure into the fuel of the fuel tank.

In a third aspect, there is provided a method for treating fuel in a fuel tank comprising: injecting an inert gas in a fuel tank to fill an ullage formed in the fuel tank above a fuel level; injecting an inert gas into the fuel to dissolve nitrogen into the fuel; and blocking gas bubbles in the fuel from an outlet of the tank.

Further details of these and other aspects of the present invention will be apparent from the detailed description and figures included below.

DESCRIPTION OF THE DRAWINGS

Reference is now made to the accompanying figures, in which:

FIG. 1 is a schematic view of a fuel tank of an aircraft, with a bubbler system in accordance with the present disclosure.

BRIEF DESCRIPTION OF THE FIGURES

Referring to FIG. 1, there is illustrated a tank 10 of the type stocking fuel, in an aircraft, whereby the tank 10 may be part of an aircraft. Although generally shown as being rectangular, the tank 10 may have any appropriate shape. The tank 10 may also be referred to as a reservoir.

The tank 10 defines an internal storage volume 12 (i.e., inner cavity, recipient cavity, etc) in which liquid fuel A is received and is stocked. Gasses typically fill the ullage B, at the surface of the fuel A. A gas inlet 14 is connected to a top of the tank 10 and provides a feed of gasses, such as Oxygen-depleted air, to the tank 10, to fill the ullage B. The tank 10 comprises a fuel filler port or inlet 15 by which fuel is fed to the tank 10, or any other appropriate ports. An outlet 16 is located at a bottom or near a bottom of the tank 10. Other components may also be present, though not shown for simplicity, such as valves, atmospheric vent 17, etc. Moreover, the tank 10 may have more than one inlet 15 and/or outlet 16.

A dividing wall 18 (i.e., divider wall, baffle) separates the outlet fuel side from the bubbled fuel side. The outlet 16 is located on an outlet fuel side of the tank 10, while the inlet 14 is typically located in the bubbled fuel side of the tank 10, although the inlet 14 could be located on the outlet fuel side as well. The dividing wall 18 has a plurality of ports or holes to allow fuel to pass from one side of the tank 10 to another. Moreover, the ports are sized so as to prevent or reduce the migration of bubbles from the bubbled fuel side to the outlet fuel side. Other devices may be used, as alternatives or as supplements, to prevent the ingestion of bubbles/gasses by the outlet 16.

A bubbler system 20 is provided in a tank 10, to inject nitrogen or oxygen-depleted air in the fuel. In the illustrated embodiment, the bubbler system 20 has an inlet 22 that is in fluid communication with an upper portion of the tank 10, i.e., the ullage B. According to the illustrated embodiment, the inlet 22 draws in ambient nitrogen by the action of a pump 24, or any other appropriate means for inducing gas flow. The bubbler system 20 may operate with other inert gasses, for instance available from other sources such as tanks. However, Nitrogen is generated by removing Oxygen from the ambient air, and this is a convenient solution as air is always available and does not need to be carried on the aircraft.

A bubbler pipe 26 (or more) of the bubbler system 20 is at an outlet end of the bubbler system 20. The bubbler pipe 26 is therefore in fluid communication with the inlet 22 and the pump 24 and receives a flow of Nitrogen, Oxygen depleted air, or other inert gas. The bubbler pipe 26 extends into the bubbled fuel side of the tank 10, and may be located in a bottom part of the tank 10, to be immersed in the fuel of the tank A, when the fuel level is above the level of the bubbler pipe 26. The bubbler pipe 26 has ports 28 of suitable size defined in its surface or equivalent porous structure, for the bubbler pipe 26 to injected the inert gas in the fuel A, creating a bubbling effect. The bubbles of inert gas will therefore rise toward the ullage B, with a portion of the inert gas being dissolved into the fuel A. In the illustrated embodiment, the bubbler pipe 26 is generally horizontal relative to an orientation of the tank 10. Although the illustrated embodiment shows the bubbler system 20 as obtaining a feed of nitrogen from the ullage B, the bubbler system 20 may instead be connected to a source of inert gas located outside the tank 10. For instance, the bubbler pipe 26 may be connected to the same source as that of the gas inlet 14. Alternatively the Nitrogen feed to the ullage B may be through the bubbler system, in which case the pump 24 may not be required.

Therefore, the assembly of the tank 10 and bubbler system 20 allows to treat the fuel in a fuel tank so as to maintain a low level of dissolved oxygen in the fuel. An inert gas, such as Nitrogen, or Oxygen-depleted air is injected at the inlet 14 of the fuel tank 10 to fill the ullage B formed in the fuel tank A above a fuel level. Oxygen Depleted air is simultaneously injected into the fuel by the bubbler system 20 to dissolve inert gas into the fuel. Bubbles in the fuel are blocked from the outlet 16 of the tank 10. When Oxygen depleted air is injected into the fuel, this may be performed by sucking the Oxygen depleted air from the ullage B via bubbler inlet 22, for instance by activating a gas circulating pump 24.

Accordingly, by the use of the bubbler system 20, the content of dissolved inert gas in the fuel of the tank 10 is increased toward a dissolved-gas saturation limit of the fuel. Hence, by injection bubbles into the fuel A, the fuel A is induced into absorbing the inert gas toward its dissolved-gas saturation limit, such that the fuel A may no longer absorb gasses. As a result, the fuel A may not be capable of absorbing oxygen, if exposed thereto. Thus, by the use of the bubbler system 20 in the tank A, the relative partial pressure of oxygen is maintained low by the feed of nitrogen-rich air via the gas inlet 14. Oxygen depleted air, from the ullage B or from another source, is bubbled into the fuel A by the bubbler system 20 to induce inert gas absorption by the fuel A. As the fuel has a given capacity for dissolving a gas, the arrangement is effectively used to displace the dissolved oxygen with nitrogen in the given example.

Hence, according to an embodiment, the bubbler system 290 makes use of an existing system required for safety purposes, namely, the inerting system, to reduce the autoxidation characteristic of fuel when exposed to high temperatures, without the need of a separate fuel de-oxygenation system.

The above description is meant to be exemplary only, and one skilled in the art will recognize that changes may be made to the embodiments described without departing from the scope of the invention disclosed. For example, the fuel tank 10 and gas bubbler system 20 may be used in fuel systems of any appropriate aircraft. Still other modifications which fall within the scope of the present invention will be apparent to those skilled in the art, in light of a review of this disclosure, and such modifications are intended to fall within the appended claims.

The invention claimed is:

1. An assembly of fuel tank and bubbler system comprising:
    a fuel tank defining a storage volume adapted to receive fuel therein, the fuel tank comprising at least one fuel inlet, at least one fuel outlet, and at least one gas inlet adapted to be connected to an inert gas source to feed inert gas to fill an ullage in the storage volume;
    a bubbler system having at least one pipe extending into the fuel tank and adapted to be immersed into the fuel of the fuel tank, the pipe having a porous structure, the at least one pipe adapted to be connected to an inert gas source to inject inert gas via the porous structure into the fuel of the fuel tank; and
    a wall in the storage volume between the at least one pipe and the at least one fuel outlet, the wall having ports sized to allow fuel to pass therethrough and to limit bubble circulation therethrough.

2. The assembly according to claim 1, wherein the bubbler system has a bubbler inlet connected to an upper part of the tank and adapted to be in fluid communication with the ullage, the bubbler inlet being in fluid communication with the at least one pipe to inject the inert gas from the ullage into the fuel.

3. The assembly according to claim 2, further comprising a gas circulating pump in the bubbler system, between the bubbler inlet and the at least one pipe.

4. The assembly according to claim 1, wherein the at least one pipe is generally horizontal in the tank.

5. The assembly according to claim 1, wherein the inert gas is nitrogen in oxygen-depleted air.

6. An aircraft comprising:
    a fuel tank defining a storage volume adapted to receive fuel therein, the fuel tank comprising at least one fuel inlet, at least one fuel outlet, and at least one gas inlet adapted to be connected to an inert gas source to feed inert gas to fill an ullage in the storage volume;
    a bubbler system having at least one pipe extending into the fuel tank and adapted to be immersed into the fuel of the fuel tank, the pipe having a porous structure, the at least one pipe adapted to be connected to an inert gas source to inject inert gas via the porous structure into the fuel of the fuel tank; and
    a wall in the storage volume between the at least one pipe and the at least one fuel outlet, the wall having ports sized to allow fuel to pass therethrough and to limit bubble circulation therethrough.

7. The aircraft according to claim 6, wherein the bubbler system has a bubbler inlet connected to an upper part of the tank and adapted to be in fluid communication with the ullage, the bubbler inlet being in fluid communication with the at least one pipe to inject inert gas from the ullage into the fuel.

8. The aircraft according to claim 7, further comprising a gas circulating pump in the bubbler system, between the bubbler inlet and the at least one pipe.

9. The aircraft according to claim 6, wherein the at least one pipe is generally horizontal in the tank.

10. The aircraft according to claim 6, wherein the inert gas is nitrogen in oxygen-depleted air.

* * * * *